Aug. 12, 1930.   W. K. QUEEN   1,772,758
METHOD OF MAKING PACKING RINGS
Original Filed March 10, 1923   2 Sheets-Sheet 1
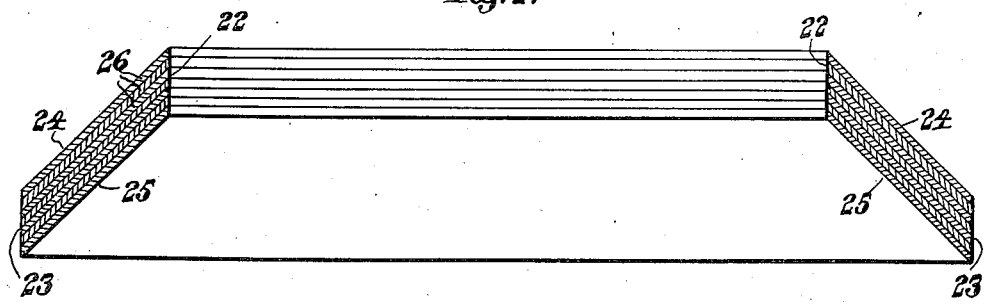
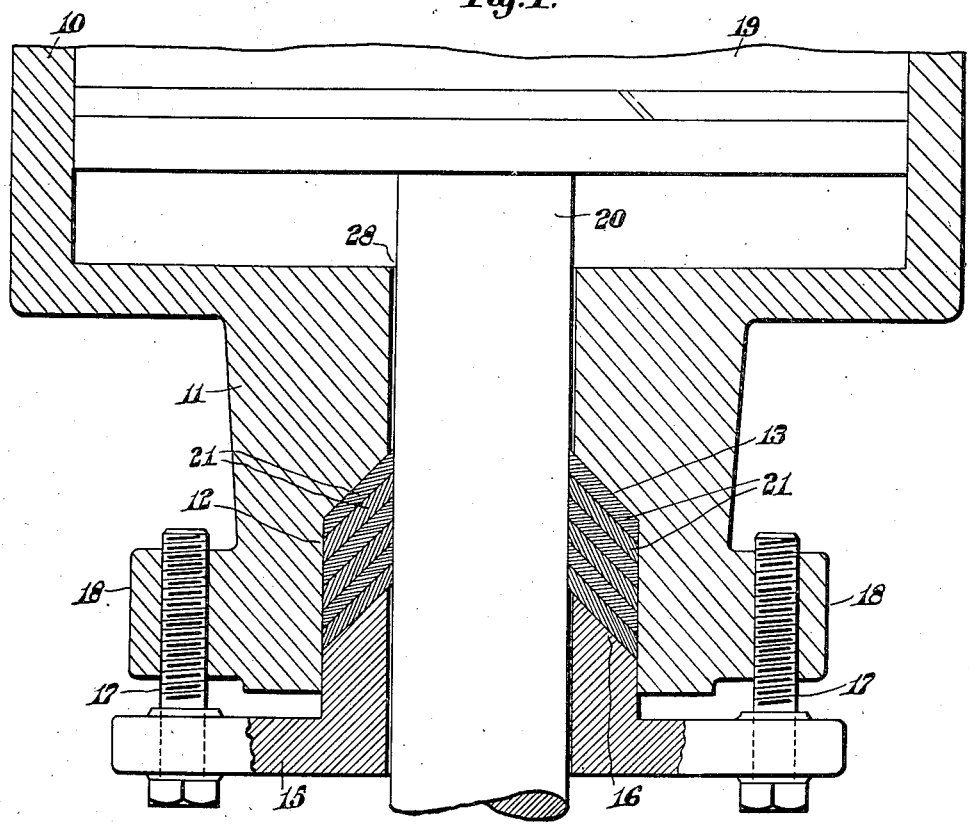
Inventor:
Walter K. Queen.
by Walter E. Lombard.
Atty.

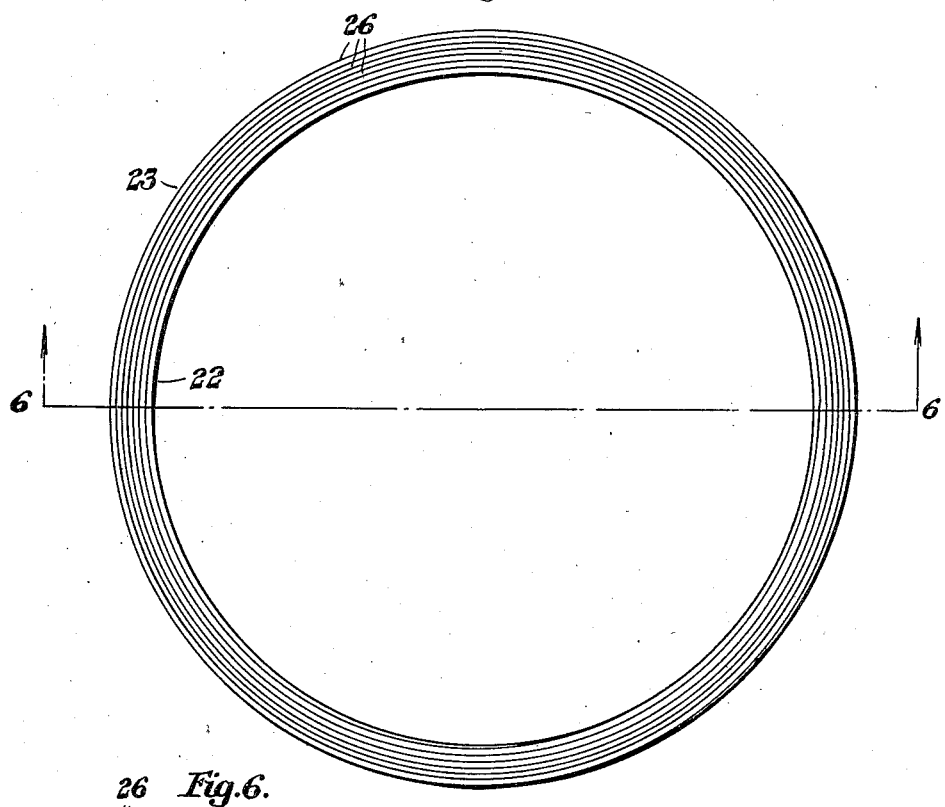

Patented Aug. 12, 1930

1,772,758

UNITED STATES PATENT OFFICE

WALTER K. QUEEN, OF NEEDHAM HEIGHTS, MASSACHUSETTS

METHOD OF MAKING PACKING RINGS

Original application filed March 10, 1923, Serial No. 624,243. Divided and this application filed January 19, 1928. Serial No. 247,923.

This invention relates to methods of making packing rings, the object of the invention being to provide a cheaply constructed but effective ring adapted to be used in self-setting packings to be used in stuffing boxes to prevent the leakage of steam.

This particular invention consists in spirally winding a strip of asbestos, subjecting the same to pressure to change its shape, and retaining the winds of the strip in contact by an adhesive substance until subjected to steam heat, when the adhesive will dissipate and permit the separate winds of the asbestos strip to move relatively to each other.

The present invention is a division of my application No. 624,243, filed March 10, 1923, on which Patent 1,716,977 was issued June 11, 1929 for Packing rings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claim.

Of the drawings:

Figure 1 represents a section of a stuffing box provided with a self-adjusting packing in which are used packing rings embodying the principles of the present invention.

Figure 2 represents a section of one of the packing rings.

Figure 3 represents an elevation of a strip of material from which the ring is formed.

Figure 4 represents a section of the same.

Figure 5 represents a plan of a ring formed from said strip of material wound spirally and before being subjected to pressure, and Figure 6 represents a section of same on line 6, 6, on Fig. 5.

Similar characters indicate like parts throughout the several figures of the drawings.

In the drawings, 10 is a cylinder of an engine, or similar machine, said cylinder being provided with a hub 11 having a cylindrical depression 12 in the end thereof. The inner end of the depression is cone-shaped as indicated at 13 and extending into the depression 12 is the hub of a gland 15, the inner end of the hub having a cone-shaped wall 16 parallel to the cone-shaped wall 13 at the inner end of the depression 12.

The gland 15 may be adjusted relatively to the hub 11 by means of bolts 17 extending through said gland 15 and threaded to the flange 18 on the hub 11. Within the cylinder 10 is a piston 19 having a piston rod 20 extending through said hub 11 and the gland 15.

Between the cone-shaped walls 13 and 16 and between the piston rod 20 and the inner walls of the depression 12 a space is formed in which are positioned a plurality of packing rings 21. Each of these packing rings 21 is formed as shown in Fig. 2 of the drawings, with concentric walls 22 and 23, the opposite ends of which are connected by the inclined walls 24 and 25, which are parallel to each other.

Each packing ring 21 is formed by winding spirally a long strip 26 preferably of asbestos or some similar material. Before winding the strip 26 spirally into the position indicated in Fig. 5 of the drawings, a thin coating of adhesive material as indicated at 27 is applied to the opposite surfaces thereby by means of a brush.

The adhesive used is preferably a solution of rubber and gasolene and will dissipate when subjected to sufficient heat.

This thin coating of adhesive only serves as a means for retaining the ring in position until it is assembled in the stuffing box of an engine or other machine. The adhesive coating 27 is of such a character that as soon as it is subjected to the heat of the cylinder 10, it will dissipate and leave the winds of the strip of material 26 free to move relatively to each other.

When the strip of material 26 has been spirally wound to form a packing ring 21, as indicated in Figs. 5 and 6 of the drawings, said ring is then placed upon a mandrel between suitable dies and subjected to pressure, thereby forcing the different winds of the strip 26 into the position indicated in Fig. 2 of the drawings with all of the winds or layers parallel to the inclined walls 24, 25, and with the separate working edges of the said winds or layers forming the vertical concentric walls of said ring.

This compression of the spirally wound strips causes it to assume a position in which it is helically wound with the various winds overlaying each other.

There is a clearance between the piston rod 20 and the inner wall of the hub 11, so that the steam or other material within the cylinder 10 is free to move outwardly from the cylinder against the inner ends of the various winds of the ring 21.

As soon as this steam or other material comes into contact with the packing rings 21, the adhesive 27 will dissipate and the various overlaying winds or layers of the packing ring will become detached from each other.

The pressure of the steam or other material entering the annular space 28 will act upon the inner diameter of the packing rings and force the working edges of the various winds into firm contact with the piston rod 20, thereby effectually preventing any leakage from the cylinder.

It will be noted that the greater the pressure of steam or other material in the cylinder, the greater will be the force against the smaller end of the piston rings 21 to retain the walls 22 in contact with the periphery of said piston ring.

Any steam which is capable of passing the upper packing ring 21 will act in the same manner upon the next packing ring 21 to force its inner cylindrical wall into contact with the piston rod.

Even when the piston 19 is moving upwardly, there is always sufficient pressure within the cylinder to retain the inner walls of the piston rings in frictional contact with the piston rod 20, and thereby prevent leakage under all conditions.

Preferably each ring 21 is covered with graphite before being positioned in the stuffing box.

This makes a very simple method of constructing packing rings for stuffing boxes of engines and similar machines, which is very effective in its operation.

Having thus described my invention, I claim:

The method of making packing rings consisting of spirally winding a strip of fibrous material, temporarily retaining the winds in contact with each other, and then by pressure forcing said spiral winds into helical winds with the edges of said strip in concentric cylindrical surfaces.

Signed by me at 746 Old South Bldg., Boston, Mass., this 12th day of January, 1928.

WALTER K. QUEEN,